(12) United States Patent
Su

(10) Patent No.: US 11,345,196 B2
(45) Date of Patent: May 31, 2022

(54) TIRE VALVE ASSEMBLY

(71) Applicant: Qinglin Su, KunShan (CN)

(72) Inventor: Qinglin Su, KunShan (CN)

(73) Assignee: KUNSHAN FULUO AUTO PARTS CO., LTD., Kunshan (CN)

( * ) Notice: Subject to any disclaimer, the term of this patent is extended or adjusted under 35 U.S.C. 154(b) by 191 days.

(21) Appl. No.: 16/848,653

(22) Filed: Apr. 14, 2020

(65) Prior Publication Data

US 2021/0316578 A1 Oct. 14, 2021

(51) Int. Cl.
*F16K 15/20* (2006.01)
*B60C 29/00* (2006.01)
*B60C 29/06* (2006.01)
*B60C 29/02* (2006.01)

(52) U.S. Cl.
CPC .......... *B60C 29/005* (2013.01); *B60C 29/062* (2013.01); *B60C 29/02* (2013.01); *Y10T 137/3786* (2015.04)

(58) Field of Classification Search
CPC . B60C 29/062; B60C 5/004; Y10T 137/3584; Y10T 137/3786
See application file for complete search history.

(56) References Cited

U.S. PATENT DOCUMENTS

| | | | | | |
|---|---|---|---|---|---|
| 3,765,469 | A | * | 10/1973 | LeJeune | B60C 29/062 |
| | | | | | 152/415 |
| 5,816,284 | A | * | 10/1998 | Lin | F16K 15/20 |
| | | | | | 137/223 |
| 2017/0043636 | A1 | * | 2/2017 | Vettore | B60C 5/22 |
| 2019/0263201 | A1 | * | 8/2019 | Chang | B60C 29/02 |
| 2020/0086700 | A1 | * | 3/2020 | Kobler | B60C 5/004 |

\* cited by examiner

*Primary Examiner* — Robert K Arundale
(74) *Attorney, Agent, or Firm* — Che-Yang Chen; Law Office of Michael Chen

(57) ABSTRACT

A tire valve assembly is disclosed. The tire valve assembly includes a gas nozzle structure, a movable rod, an air pipe, an elastic close contact pad, a screw nut, an elastic O-ring and a dust cap. The tire valve assembly can use a punched hole on the end of the movable rod to receive the tire repair liquid flowing into the air pipe. Take out the movable rod during maintenance to remove the tire repair liquid in the punched hole. When the movable rod is reinstalled in the air pipe, the tire repair liquid remaining on the inner wall of the air pipe will also be squeezed out of the air pipe. With this, the tire repair liquid will no longer block the tire valve assembly.

12 Claims, 11 Drawing Sheets

TIRE VALVE ASSEMBLY

FIELD OF THE INVENTION

The present invention relates to a tire valve assembly. More particularly, the present invention relates to a tire valve assembly which is used on the wheel frame of the bicycle, allowing the tire repair liquid to flow in the tire for repair without blocking the tire valve assembly.

BACKGROUND OF THE INVENTION

Bicycles are one of the main means of transportation for people. Because bicycles run without energy consumption, in addition to being environmentally friendly, it also allows people who use bicycles to achieve another purpose of exercising. Although bicycle is convenient, inadvertent use of the bicycle, such as puncture of tire caused by sharp objects, may cause bicycle damage and become a burden when people travel. Therefore, in addition to sending bicycles with broken tires to car dealers to repair or replace new tires afterwards, in recent years, it has become increasingly popular to use tire repair liquid to repair small holes to reduce the trouble caused by the unexpected blowout. The tire repair liquid is a liquid mixture composed of multiple polymer compounds, different fine rubbers or fibers. After filling the tire through the valve of the wheel frame, the tire repair liquid covers the inside of the tire. When the tire has a hole, the tire repair liquid will infiltrate the hole, contact the air and quickly solidify to fill up the hole.

Because the tire repair liquid has a certain viscosity and the possibility of curing, when the valve is repeatedly used to inflate the tire, the end of the valve is often affected by the tire repair liquid and shrinks. This results in reduced air intake, and even obstruction, which necessitates replacement of the valve. In order to solve the aforementioned problem, the industry has many improved technologies. One of them is the tubeless valve stem disclosed in Taiwan's utility patent No. M564673. Please see FIG. 1. It is an illustration of the aforementioned patent. A body of the tubeless valve stem is divided into a thread section 1, an annular installation section 2 and a split-flow section 3. An airtight body 5 is installed in the annular installation groove 4 on the outside if the annular installation section 2. A flange 6 is formed below the split-flow section 3. A through hole 7 is formed in the center of the flange 6. A side of the split-flow section 3 forms two side holes 8. In addition, a backstop sleeve 9 is installed on the outside of the split-flow section 3, between the airtight body 5 and the flange 6. When the user injects the tire repair liquid into the tire, the tire repair liquid is injected from the conduit 10 of the tubeless valve stem. Said tire repair liquid will flow out from the through hole 7. After the tire repair liquid has been injected, the user hermetically seals the tubeless valve stem from the upper side. If the tire repair liquid remains in the through hole 7, during the subsequent inflating of the tire by the user, although the through hole 7 may have a reduced hole diameter due to the residual tire repair liquid, the pressure of the injected gas in the conduit 10 will rise and spread out the backstop sleeve 9. This allows the gas to smoothly enter the tire from the side hole 8 and then reduce the effect of residual tire repair liquid on the air intake of the tubeless valve stem.

The core principle of the aforementioned technology is to provide another outlet position (side hole 8) after the gas is blocked at the main outlet position (through hole 7). However, the remaining tire repair liquid between the backstop sleeve 9 and the split-flow section 3 may also stick to backstop sleeve 9 and split-flow section 3, further sealing the side hole 8, so that all outlets are sealed and the tubeless valve stem cannot be used. Since the existing technology still cannot effectively solve the problem of existing tire repair liquid, therefore, the present invention was developed.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to solve the problem mentioned above, a tire valve assembly is disclosed in the present invention. The tire valve assembly includes: a gas nozzle structure, comprising: an air intake tube, having a first external thread section formed on an upper end externally, and a second external thread section formed below the first external thread section; a movable screw, mounted inside the air intake tube, having a third external thread section formed on a top end, wherein a first seal ring is fixedly set below the third external thread section; and a limiting nut, mounted on the third external thread section, being rotatingly adjusted to limit a displaceable length of the movable screw relative to the air intake tube; a movable rod, successively comprising a connecting section, an indented section, a tire repair liquid accommodation section and a first installation section from top to bottom, wherein the connecting section is connected to a lower end of the movable screw, a second seal ring is fixed to the outside of the first installation section, at least one punched hole non-parallel to an axis of the movable rod is formed in the tire repair liquid accommodation section, and an outer diameter of the indented section is smaller than that of the connecting section, that of tire repair liquid accommodation section and that of the second seal ring; and an air pipe, successively comprising a fourth external thread section, a second installation section and a round mounting seat from top to bottom externally, and successively comprising a first internal thread section and a smooth section from top to bottom internally, wherein the air intake tube is able to fixed on an upper end of the air pipe by rotationally connecting the second external thread section and the first internal thread section, and an inside diameter of the smooth section is substantially equal to or less than an outer diameter of the second seal ring so that when the movable rod is pushed and pulled by the movable screw to move within the air pipe, friction exists between the second seal ring and the smooth section.

According to the present invention, the second seal ring may be pushed by the movable screw to move out of the smooth section from a lower end of the air pipe, so that air from a gas nozzle of an external inflator enters an upper end of the air intake tube, goes through an air flowing space between the movable rod and the air pipe, and then flows out of the lower end of the air pipe. When the limiting nut is rotated to closely contact an upper end of the air intake tube and a lower end of the air intake tube is closely contacted the first seal ring, the displaceable length is zero and air from a gas nozzle of an external inflator is not able to enter an air flowing space between the movable rod and the air pipe through an upper end of the air intake tube. When tire repair liquid flows in from a lower end of the air pipe, the tire repair liquid flows to the at least one punched hole due to surface tension.

Preferably, a second internal thread section may be formed inside the connecting section, a fifth external thread section is formed on a lower end of the movable screw, and the movable rod and the movable screw are connected by rotationally connecting the second internal thread section and the fifth external thread section.

In one embodiment, the connecting section and the movable screw are integrally formed.

Preferably, the punched hole may pass through an axis of the movable rod and be perpendicular to a direction of the axis of the movable rod. The outer diameter of the indented section may be fixed or gradually enlarged from one end to the other.

Said tire valve assembly may further comprise an elastic close contact pad, movably mounted on the outside of the second installation section and limited by the round mounting seat not to slip out from a lower end of the air pipe. Said tire valve assembly may also further comprise a screw nut, being able to rotate over the fourth external thread section to adjust its position on the air pipe, wherein when the air pipe is installed on a wheel frame, the screw nut is rotated to be close to the elastic close contact pad to tightly fix the wheel frame therebetween. Said tire valve assembly may still further comprise an elastic O-ring, mounted on the fourth external thread section and between the screw nut and the elastic close contact pad. Said tire valve assembly may still also further comprise a dust cap, having a third internal thread section formed internally and being able to rotationally connect to the first external thread section to prevent dust from entering from an upper end of the air intake tube.

The tire valve assembly in the present invention can use the punched hole on the end of the movable rod to receive the tire repair liquid flowing into the air pipe. Take out the movable rod during maintenance to remove the tire repair liquid in the punched hole. When the movable rod is reinstalled in the air pipe, the tire repair liquid remaining on the inner wall of the air pipe will also be squeezed out of the air pipe. With this, the tire repair liquid will no longer block the tire valve assembly.

DETAILED DESCRIPTION OF THE PREFERRED EMBODIMENTS

The technical solutions in the embodiments of the present invention will be clearly and completely described below with reference to the accompanying drawings in the embodiments of the present invention. Obviously, the described embodiments are only part of the embodiments of the present invention, but not all of the implementation examples. Based on the embodiments of the present invention, all other embodiments obtained by those skilled in the art without making creative work fall into the scope of protection of the present invention.

Figure 1:
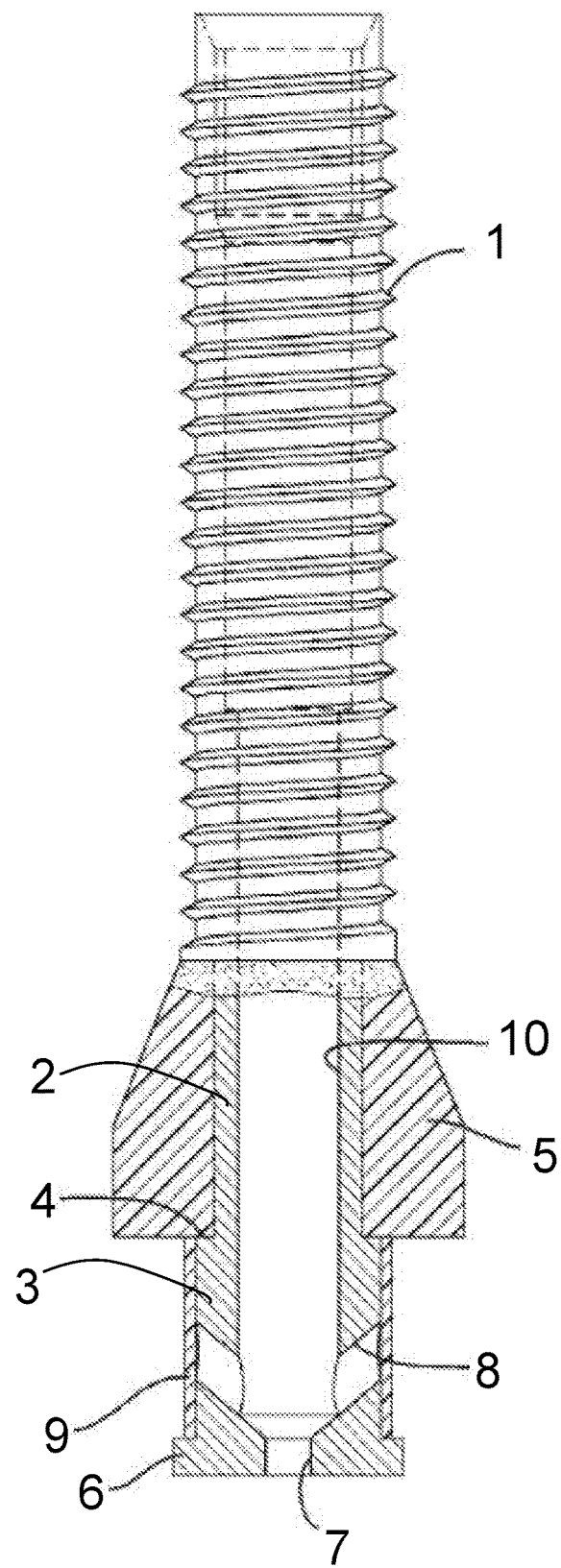
FIG. 1 is an explanatory diagram of a tubeless valve stem of a prior art.
Figure 2:
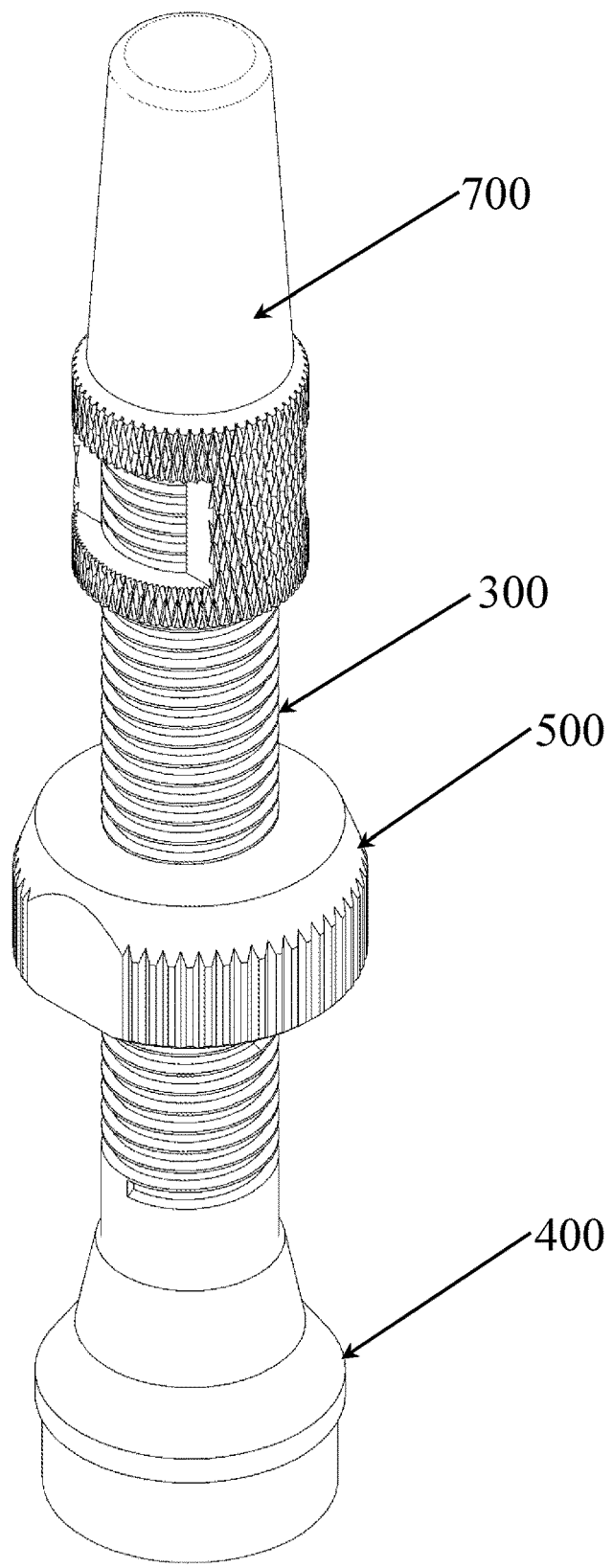
FIG. 2 is a schematic diagram of a tire valve assembly according to an embodiment of the present invention.
Figure 3:
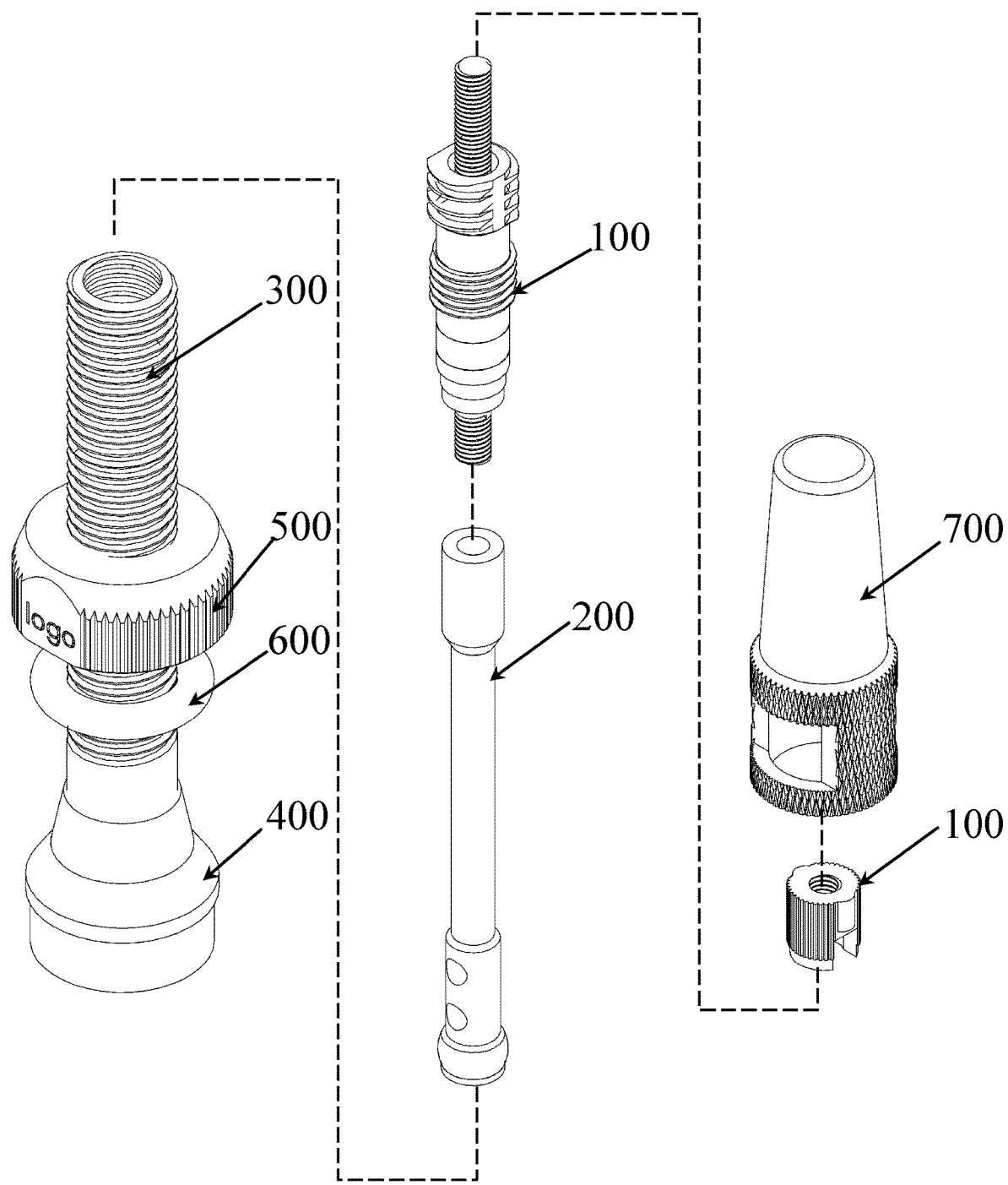
FIG. 3 is a schematic diagram of decomposed components of the tire valve assembly.

Please see FIG. 2 and FIG. 3. FIG. 2 is a schematic diagram of a tire valve assembly according to an embodiment of the present invention. FIG. 3 is a schematic diagram of decomposed components of the tire valve assembly. The tire valve assembly includes a gas nozzle structure 100, a movable rod 200, an air pipe 300, an elastic close contact pad 400, a screw nut 500, an elastic O-ring 600 and a dust cap 700. The structure, functions and interactive operation of each technical component will be explained in detail below.

Figure 4:
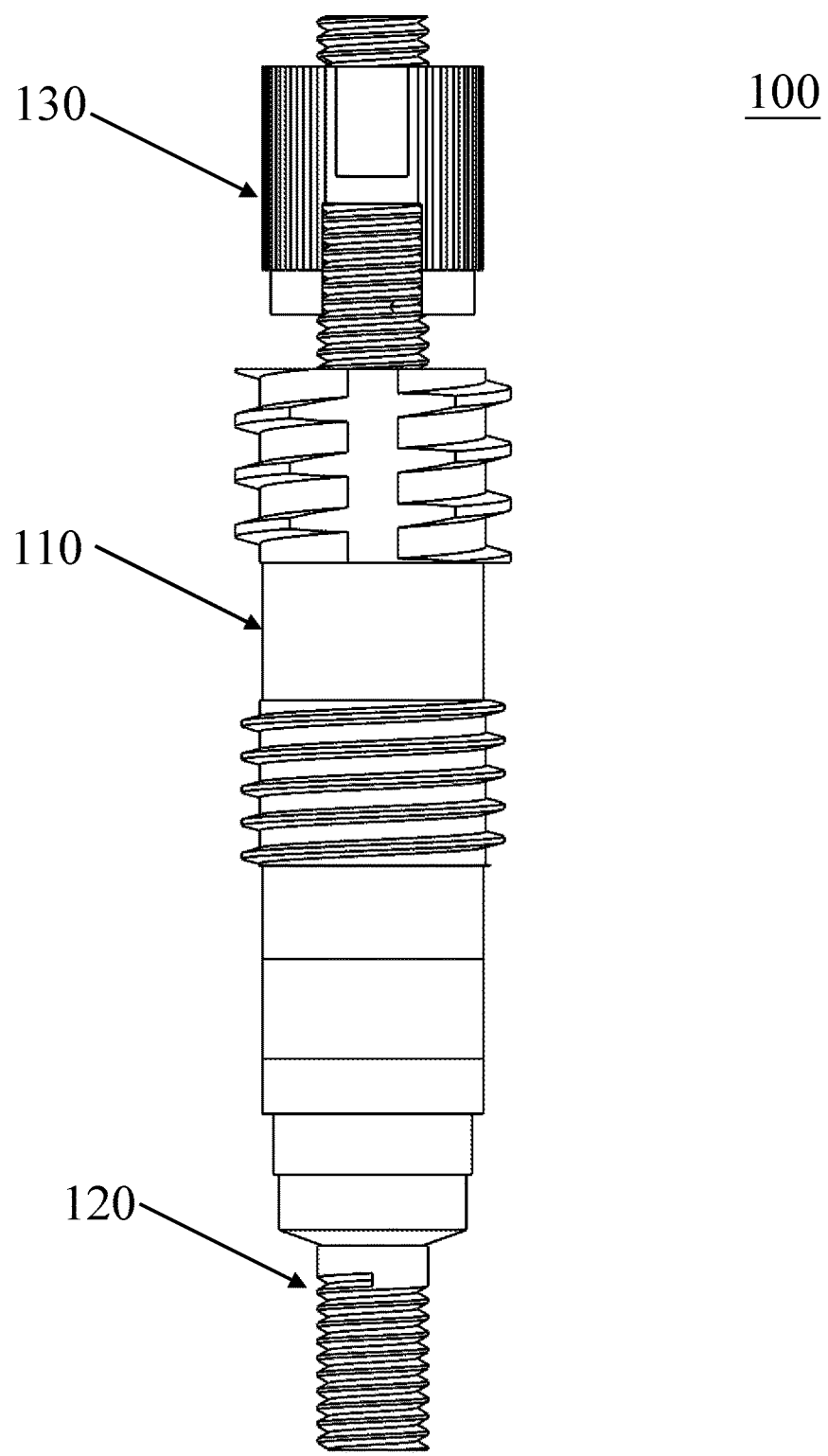
FIG. 4 is a schematic diagram of appearance of a gas nozzle structure.
Figure 5:
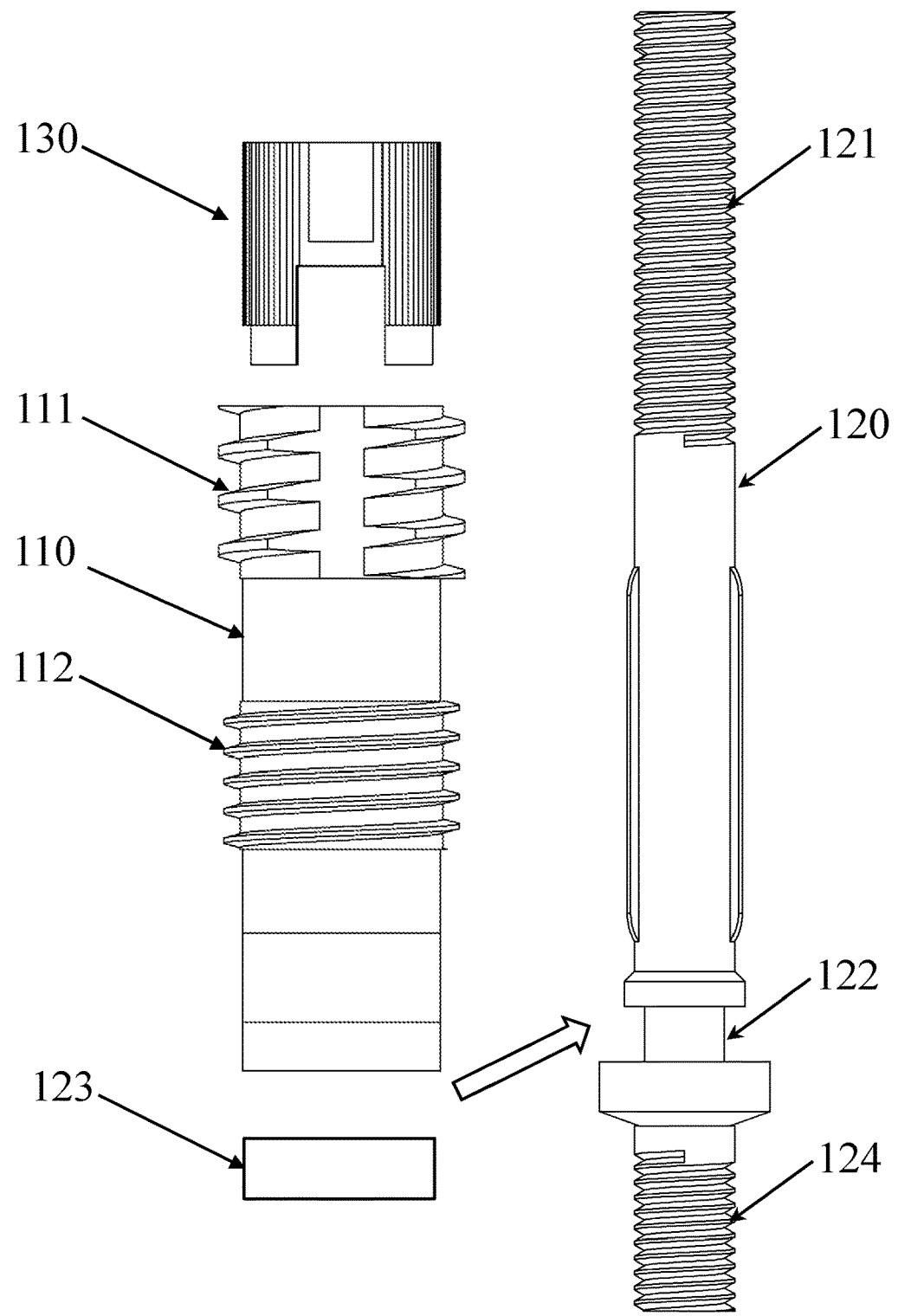
FIG. 5 is a schematic diagram of decomposition of the gas nozzle structure.

Please see FIG. 4 and FIG. 5. FIG. 4 is a schematic diagram of appearance of a gas nozzle structure 100. FIG. 5 is a schematic diagram of decomposition of the gas nozzle structure 100. The gas nozzle structure 100 comprises an air intake tube 110, a movable screw 120 and a limiting nut 130. The air intake tube 110 is the first element that air passes through when a gas nozzle of an external inflator (not shown) inflates a tire through the tire valve assembly. The air intake tube 110 has a first external thread section 111 formed on an upper end externally and a second external thread section 112 formed below the first external thread section 111. The first external thread section 111 can not only rotationally connect to the internal thread of the gas nozzle of the external inflator, but rotationally connect to the dust cap 700. When the first external thread section 111 is rotationally connected to and closely contacted with the internal thread of the gas nozzle of the external inflator, it is sure that the air from the gas nozzle of the external inflator will not escape from the outside of the air intake tube 110. The movable screw 120 is a rod, mounted inside the air intake tube 110, therefore, it can move in the axial direction in the air intake tube 110 if there is no restriction. The movable screw 120 has a third external thread section 121 on a top end. An annular setting groove 122 is formed below the third external thread section 121 to fixedly set a first seal ring 123. The first seal ring 123 is an elastomer. After it is compressed, it can fill the gap around it by its rebound force. Therefore, the first seal ring 123 can achieve the function of preventing air from leaking. In practice, the material of the first seal ring 123 may be nitrile rubber, other rubber such as ethylene propylene diene monomer rubber, fluorocarbon rubber, fluororubber, polyurethane rubber, natural rubber, etc., or silicone. A fifth external thread section 124 is formed on a lower end of the movable screw 120. The limiting nut 130 is mounted on the third external thread section 121, being rotatingly adjusted to limit a displaceable length of the movable screw 120 relative to the air intake tube 110.

When the limiting nut 130 is moved to the top of the third external thread section 121 (not removed from third external thread section 121), the movable screw 120 can move upwards relative to the air intake tube 110 till a lower end of the air intake tube 110 is stuck by the first seal ring 123, and move downwards till a lower end of the limiting nut 130 contacting an upper end of the air intake tube 110. The distance between terminals moving upwards and downwards is the replaceable length. Relatively, When the limiting nut 130 is rotated to closely contact the upper end of the air intake tube 110 and the lower end of the air intake tube 110 is closely contacted the first seal ring 123, the displaceable length is zero. Namely, the limiting nut 130, the air intake tube 110 and the movable screw 120 are stuck. Relative movement between the air intake tube 110 and the movable screw 120 cannot proceed. In terms of materials, the air intake tube 110, the movable screw 120 and the limiting nut 130 can be made of stainless steel, iron, aluminum, or other metal alloys.

Figure 6:
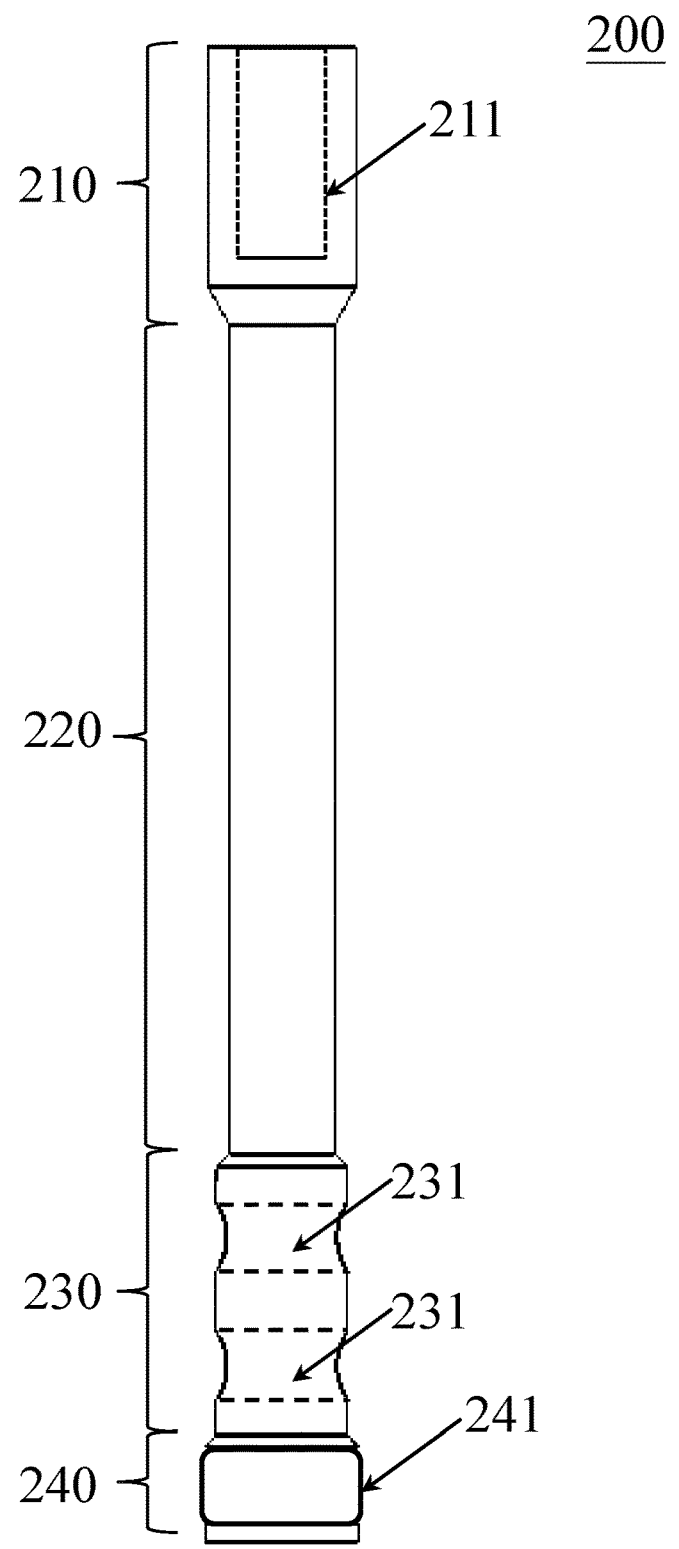
FIG. 6 is a schematic diagram of appearance of a movable rod.

Please see FIG. 6. It is a schematic diagram of appearance of a movable rod 200. The movable rod 200, from top to bottom, successively comprises a connecting section 210, an indented section 220, a tire repair liquid accommodation section 230 and a first installation section 240. The connecting section 210 is connected to the lower end of the movable screw 120. In practice, a second internal thread section 211 is formed inside the connecting section 210 (as shown by the dotted line on the top side of FIG. 6). Since the fifth external thread section 124 is formed on the lower end of the movable screw 120, the movable rod 200 and the movable screw 120 can be connected by rotationally connecting the second internal thread section 211 and the fifth external thread section 124. The indented section 220 is between the connecting section 210 and the tire repair liquid accommodation section 230. An outer diameter of the indented section 220 is smaller than an outer diameter of connecting section 210 and an outer diameter of the tire repair liquid accommodation section 230. When the movable rod 200 is placed in the air pipe 300, a larger air flowing space is formed between the indented section 220 and the inner wall of the air pipe 300. This air flowing space helps air flow during pumping and also facilitates air leakage from the tires. In the present embodiment, the outer diameter of the indented section 220 is fixed; in other embodiment, the outer diameter of the indented section 220 is gradually enlarged from one end to the other. A second seal ring 241 is fixed to the outside of the first installation section 240. The material of the second seal ring 241 is the same as the material of the first seal ring 123 but uses to seal an internal space enclosed by the inner wall at the lower end of the air pipe 300. The second seal ring 241 also has a secondary sealing function (A main sealing function is achieved by gas nozzle structure 100). When the gas nozzle structure 100 is defective, the second seal ring 241 can prevent rapid leaks. At least one punched hole 231 (between the two dotted lines on the lower side of FIG. 6) non-parallel to an axis of the movable rod 200 is formed in the tire repair liquid accommodation section 230. In the present embodiment, the number of the punched hole 231 is 2. The punched hole 231 passes through the axis of the movable rod 200 and is perpendicular to a direction of the axis of the movable rod 200. The function of the punched hole 231 will be illustrated in the text below. From FIG. 6, it is obvious that the outer diameter of the indented section 220 is than the outer diameter of the connecting section 210, the outer diameter of tire repair liquid accommodation section 230 and the outer diameter of the second seal ring 241. In terms of materials, the movable rod 200 can be made of stainless steel, iron, aluminum, or other metal alloys.

Figure 7:
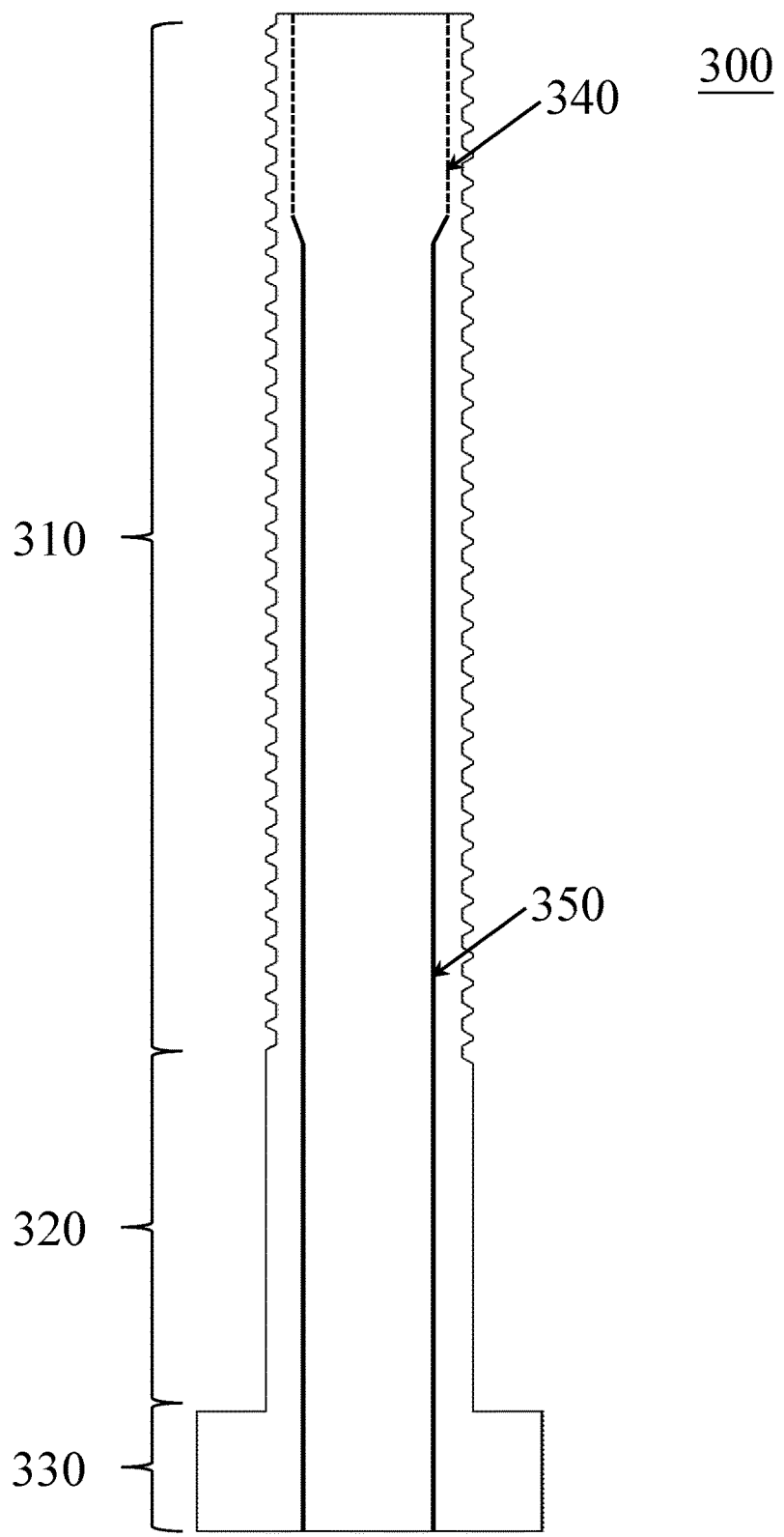
FIG. 7 is a schematic diagram of a sectional view of an air pipe.

Please see FIG. 7. It is a schematic diagram of a sectional view of the air pipe 300. The air pipe 300 successively comprises a fourth external thread section 310, a second installation section 320 and a round mounting seat 330 from top to bottom externally. The air pipe 300 also successively comprises a first internal thread section 340 (as shown by the dashed line on the top side of FIG. 7) and a smooth section 350 from top to bottom internally. The fourth external thread section 310 can meet the thread specifications of FR10 screw. The air intake tube 110 is able to be fixed on an upper end of the air pipe 300 by rotationally connecting the second external thread section 112 and the first internal thread section 340. An inside diameter of the smooth section 340 is substantially equal to or less than an outer diameter of the second seal ring 241, so that when the movable rod 200 is pushed and pulled by the movable screw 120 to move within the air pipe 300, friction exists between the second seal ring 241 and the smooth section 340. The friction can not only support the second seal ring 241 to stick the smooth section 340 but resist the air in the tire from overflowing to the air pipe 300 due to its pressure. If the inner wall of the air pipe 300 is stuck with the tire repair liquid, the second seal ring 241 can remove the tire repair liquid from the inner wall of the air pipe 300 by the friction. In terms of materials, the air pipe 300 can be made of stainless steel, iron, aluminum, or other metal alloys.

Figure 11:
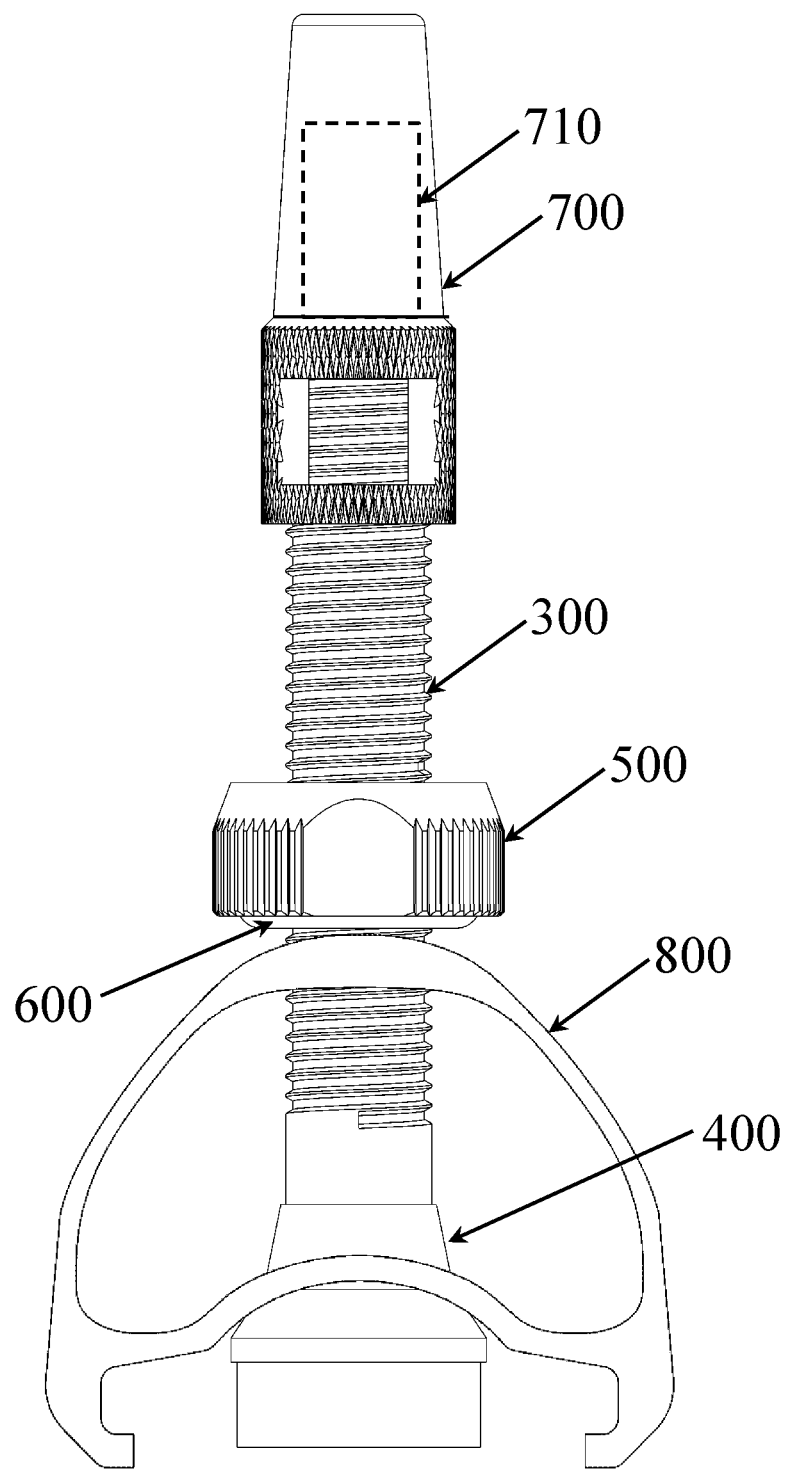
FIG. 11 illustrates a combination of the tire valve assembly and the wheel frame.

The elastic close contact pad 400 can be movably mounted on the outside of the second installation section 320 and be limited by the round mounting seat 330 not to slip out from the lower end of the air pipe 300. Material of the elastic close contact pad 400 may be nitrile rubber, rubber, silicone, etc. The screw nut 500 is able to rotate over the fourth external thread section 310 to adjust its position on the air pipe 300. When the air pipe 300 is installed on a wheel frame 800 (as shown in FIG. 11), the screw nut 500 is rotated to be close to the elastic close contact pad 400 to tightly fix the wheel frame 800 therebetween. The elastic O-ring 600 is mounted on the fourth external thread section 310 and between the screw nut 500 and the elastic close contact pad 400. The function of the elastic O-ring 600 is as a cushion between the screw nut 500 and the wheel frame 800, avoiding the screw nut 500 hurting the wheel frame 800 due to tightening. In terms of materials, the elastic O-ring 600 may also use nitrile rubber, rubber or silicone. The dust cap 700 has a third internal thread section 710 formed internally. The dust cap 700 is able to rotationally connect to the first external thread section 111 to prevent dust from entering from the upper end of the air intake tube. The dust cap 700 can also be made of stainless steel, iron, aluminum, or other metal alloys.

Figure 8:
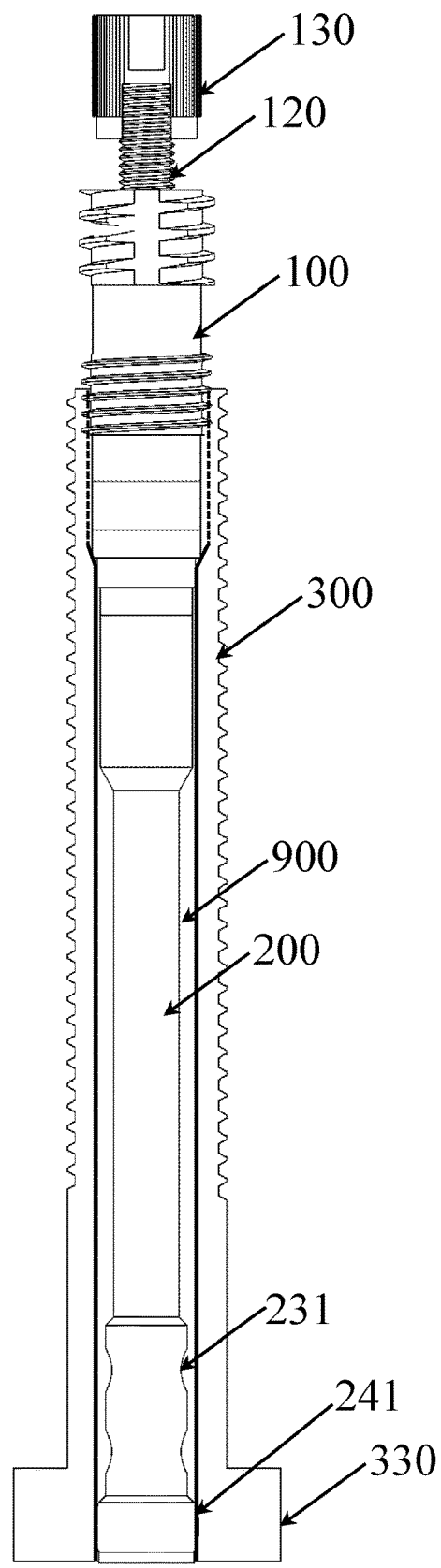
FIG. 8 is a schematic diagram showing that the gas nozzle structure is connected to the movable rod within an inner wall of the air pipe cut along a section.
Figure 9:
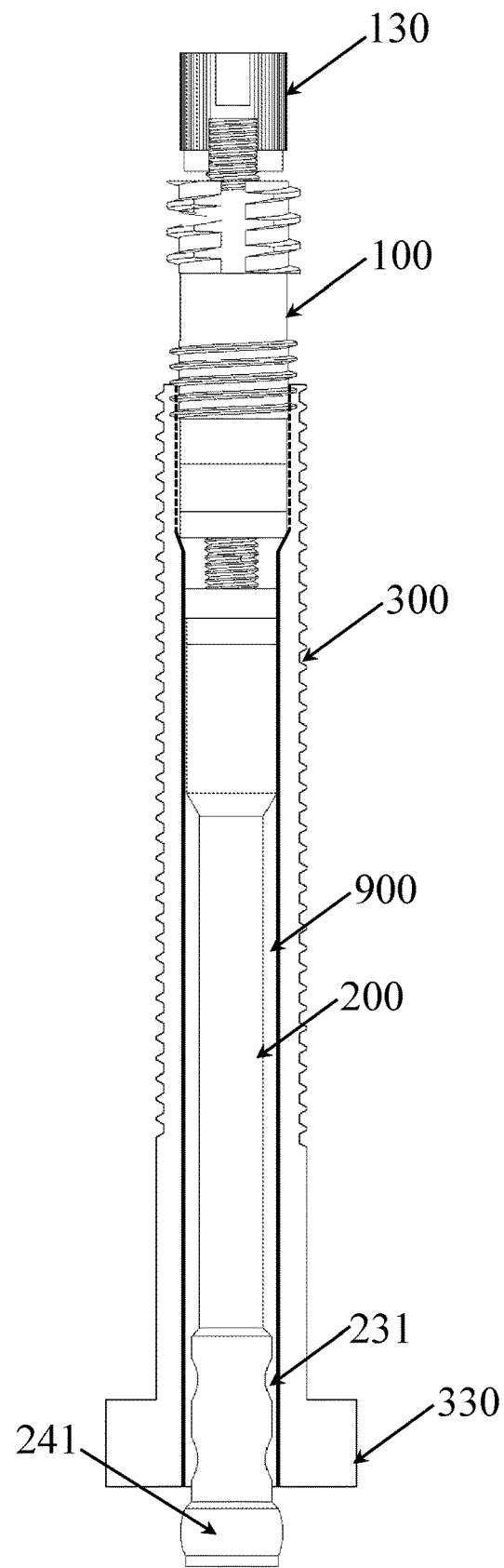
FIG. 9 is another schematic diagram showing that the gas nozzle structure is connected to the movable rod within an inner wall of the air pipe cut along a section.

The operation mode of the tire valve assembly of the present invention is described below. Please see FIG. 8 and FIG. 9. FIG. 8 is a schematic diagram showing that the gas nozzle structure 100 is connected to the movable rod 200 within the inner wall of the air pipe 300 cut along a section. FIG. 9 is another schematic diagram showing that the gas nozzle structure 100 is connected to the movable rod 200 within the inner wall of the air pipe 300 cut along a section. The purpose of sectioning the air pipe 300 along its axis is to make it easier to see the operation of the gas nozzle structure 100 and the movable rod 200 inside the air pipe 300. When the limiting nut 130 is moved to the top of the third external thread section 121, the movable screw 120 has the maximum displaceable length. As shown in FIG. 8, now, the first seal ring 123 is stuck at the lower end of the air intake tube 110. It is not able to perform inflating operation. A lower end of the movable rod 200 is aligned with a bottom of the round mounting seat 330 or slightly indented inside the round mounting seat 330. Next, push down an upper end of the movable screw 120 as shown in FIG. 9. The movable screw 120 drives the movable rod 200 down. The second seal ring 241 is pushed by the movable screw 120 to move out of the smooth section 340 from the lower end of the air pipe 300. Now, air from the gas nozzle of the external inflator enters the upper end of the air intake tube 110, goes through an air flowing space 900 between the movable rod 200 and the air pipe 300, and then flows out of the lower end of the air pipe 300. When the limiting nut 130 is rotated to closely contact the upper end of the air intake tube 110 and the lower end of the air intake tube 110 is closely contacted the first seal ring 123, air from the gas nozzle of the external inflator is not able to enter the air flowing space 900 between the movable rod 200 and the air pipe 300 through the upper end of the air intake tube 100.

Figure 10:
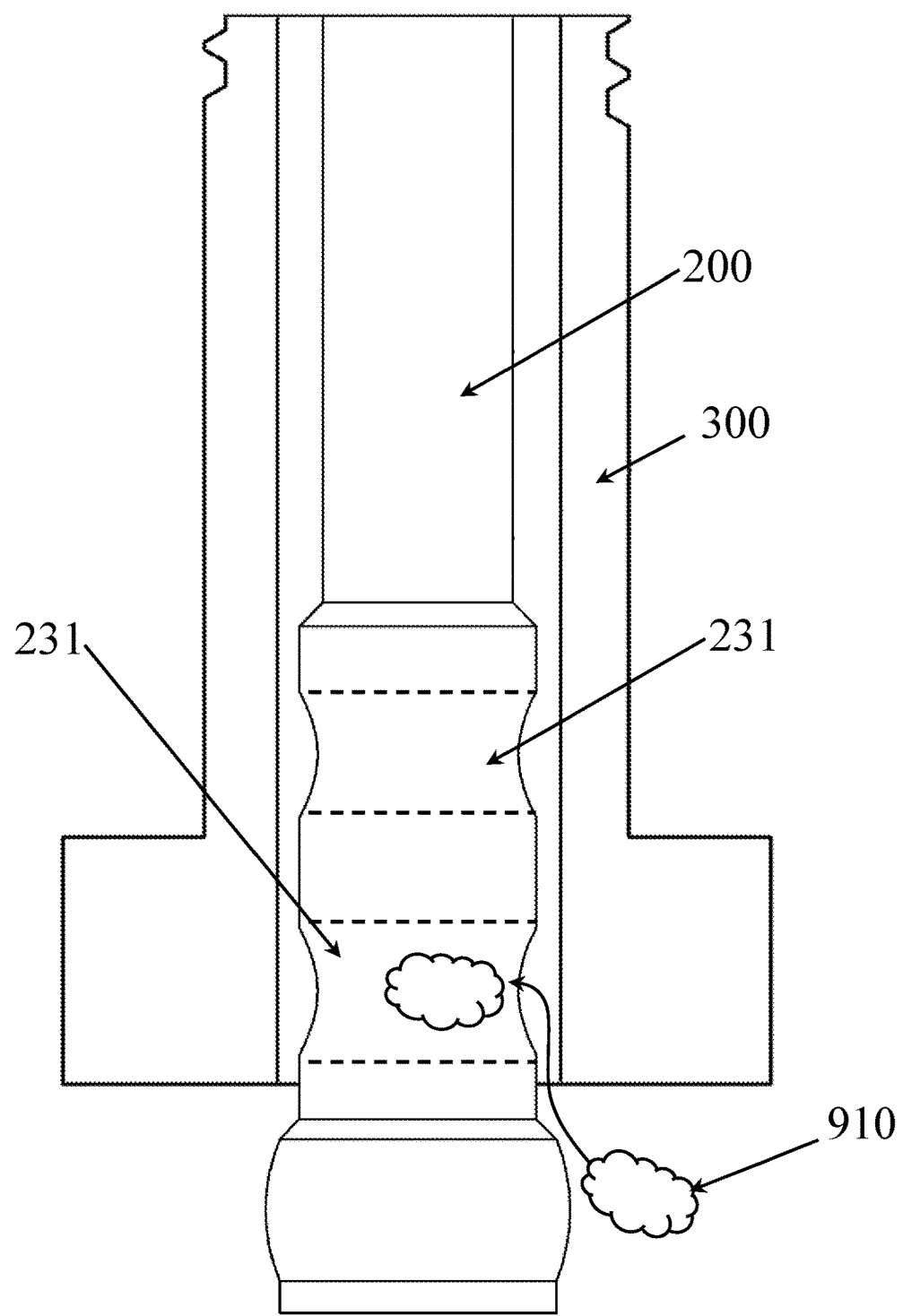
FIG. 10 illustrates an example that the tire repair liquid flows to a punched hole through a lower end of the air pipe due to surface tension.

From the above description, when the inflating operation is over, the tire repair liquid in the tire can backflow into the air pipe 300 due to pressure difference. Please see FIG. 10. When tire repair liquid 910 flows in from the lower end of the air pipe 300, the tire repair liquid 910 will flow to the punched hole 231 due to surface tension. In other words, the role of the punched hole 231 is to gather most of the tire repair liquid get into air pipe 300. The movable rod 200 can be taken out during maintenance and the tire repair liquid in punched hole 231 can be removed. When the movable rod 200 was reinstalled into the air pipe 300, the second seal ring 241 will squeeze the tire repair liquid remaining on the inner wall of the air pipe 300 out of the air pipe 300.

In other embodiment, the connecting section 210 and the movable screw 120 of the tire valve assembly can be integrally formed with no function changed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A tire valve assembly, comprising:
a gas nozzle structure, comprising:
an air intake tube, having a first external thread section formed on an upper end thereof externally, and a second external thread section formed below the first external thread section;
a movable screw, mounted inside the air intake tube, wherein the movable screw has a third external thread section formed on a top end thereof, and a first seal ring is fixedly set below the third external thread section; and
a limiting nut, mounted on the third external thread section, being rotatingly adjusted to limit a displaceable length of the movable screw relative to the air intake tube;
a movable rod, successively comprising a connecting section, an indented section, a tire repair liquid accommodation section and a first installation section from top to bottom, wherein the connecting section is connected to a lower end of the movable screw, a second seal ring is fixed to the outside of the first installation section, at least one punched hole non-parallel to an axis of the movable rod is formed in the tire repair liquid accommodation section, and an outer diameter of the indented section is smaller than that of the connecting section, that of tire repair liquid accommodation section and that of the second seal ring; and
an air pipe, successively comprising a fourth external thread section, a second installation section and a round mounting seat from top to bottom externally, and successively comprising a first internal thread section and a smooth section from top to bottom internally, wherein the air intake tube is able to be fixed on an upper end of the air pipe by rotationally connecting the second external thread section and the first internal thread section, and an inside diameter of the smooth section is substantially equal to or less than an outer diameter of the second seal ring so that when the movable rod is pushed and pulled by the movable screw to move within the air pipe, friction exists between the second seal ring and the smooth section.

2. The tire valve assembly according to claim 1, wherein the second seal ring is pushed by the movable screw to move out of the smooth section from a lower end of the air pipe, so that air from a gas nozzle of an external inflator enters an upper end of the air intake tube, goes through an air flowing space between the movable rod and the air pipe, and then flows out of the lower end of the air pipe.

3. The tire valve assembly according to claim 1, wherein when the limiting nut is rotated to closely contact an upper end of the air intake tube and a lower end of the air intake tube is closely contacted the first seal ring, the displaceable length is zero and air from a gas nozzle of an external inflator is not able to enter an air flowing space between the movable rod and the air pipe through an upper end of the air intake tube.

4. The tire valve assembly according to claim 1, wherein when tire repair liquid flows in from a lower end of the air pipe, the tire repair liquid flows to the at least one punched hole due to surface tension.

5. The tire valve assembly according to claim 1, wherein a second internal thread section is formed inside the connecting section, a fifth external thread section is formed on a lower end of the movable screw, and the movable rod and the movable screw are connected by rotationally connecting the second internal thread section and the fifth external thread section.

6. The tire valve assembly according to claim 1, wherein the connecting section and the movable screw are integrally formed.

7. The tire valve assembly according to claim 1, wherein the punched hole passes through an axis of the movable rod and is perpendicular to a direction of the axis of the movable rod.

8. The tire valve assembly according to claim 1, wherein the outer diameter of the indented section is fixed or gradually enlarged from one end to the other of the indented section.

9. The tire valve assembly according to claim 1, further comprising an elastic close contact pad, movably mounted on the outside of the second installation section and limited by the round mounting seat not to slip out from a lower end of the air pipe.

10. The tire valve assembly according to claim 9, further comprising a screw nut, being able to rotate over the fourth external thread section to adjust a position of the screw nut on the air pipe, wherein when the air pipe is installed on a wheel frame, the screw nut is rotated to approach to the elastic close contact pad to tightly fix the wheel frame therebetween.

11. The tire valve assembly according to claim 9, further comprising an elastic O-ring, mounted on the fourth external thread section and between the screw nut and the elastic close contact pad.

12. The tire valve assembly according to claim 1, further comprising a dust cap, having a third internal thread section formed internally and being able to rotationally connect to the first external thread section to prevent dust from entering from an upper end of the air intake tube.

* * * * *